United States Patent Office

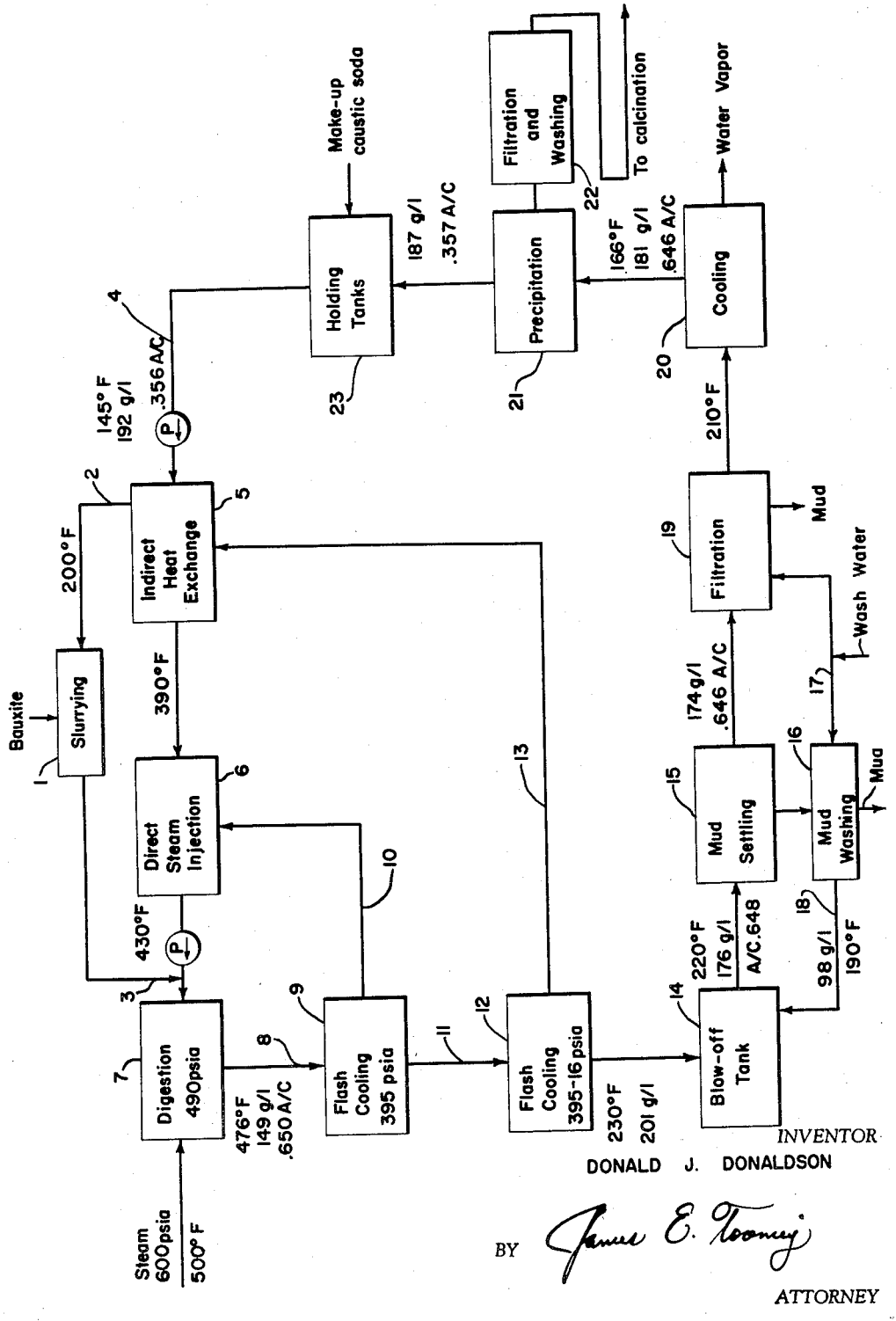

2,946,658
Patented July 26, 1960

2,946,658

CHEMICAL PROCESS FOR EXTRACTING MONO-HYDRATE ALUMINA CONTAINING MATERIALS

Donald J. Donaldson, Berkeley Woods, Calif., assignor to Kaiser Aluminum & Chemical Corporation, Oakland, Calif., a corporation of Delaware Filed June 26, 1957, Ser. No. 668,232

15 Claims. (Cl. 23—143)

The present invention relates to an improved cyclic wet alkali aluminate process for the production of alumina from aluminous materials containing monohydrate alumina. More particularly, the invention is directed to a novel process based on the well-known Bayer method for the total extraction of the caustic soluble alumina from aluminous materials containing monohydrate alumina. The process is applicable to aluminous materials wherein all of the caustic soluble alumina, or any minor amount thereof, is present in the form of alumina monohydrate.

The cyclic wet alkali aluminate method for production of alumina from aluminous materials, more commonly referred to as the Bayer process, comprises the steps of subjecting the ore to a digestion treatment in recycled spent caustic aluminate liquor of a predetermined caustic soda concentration, and usually at elevated temperatures under steam pressures, to extract the caustic soluble (available) alumina in the ore by reaction thereof with the caustic soda to form what is generally regarded as soluble sodium aluminate. The liquor is diluted during digestion by the free moisture in the ore, the water of hydration of the alumina, and by condensation of steam directly injected into the liquor for heating to the required digestion temperature. The impurities in the ore are suspended in the alumina-enriched or pregnant liquor as an insoluble ore residue consisting essentially of iron oxide, titania, and desilication product in the form of complex sodium aluminum silicates formed by reaction of the soluble silica with a portion of the sodium aluminate in the liquor.

Following digestion, the pregnant liquor is depressurized, usually in stages, and thus flash cooled from digestion temperature to substantially the atmospheric boiling point of the liquor at which temperature, it is supersaturated with respect to alumina. Water is removed by flash steam generation with cooling of the liquor during depressurizing. The liquor is subjected to clarification wherein the insoluble residues are removed by settling and decantation, and/or filtration, and/or centrifuging, usually subsequent to, but in some instances prior to depressurizing. The insoluble residues (red mud) are washed to recover the alumina and soda content of the associated liquor, and the liquor is diluted by the wash water. The clarified diluted pregnant liquor substantially free of all red mud residue may be further cooled, for example by vacuum flashing, to increase the degree of alumina supersaturation of the liquor, and alumina hydrate is precipitated by introduction of previously precipitated alumina hydrate as seed. Precipitation is usually allowed to proceed under controlled conditions for a period of time to recover approximately half of the alumina in the liquor as precipitated alumina trihydrate and to obtain a spent caustic aluminate liquor having a predetermined alumina-to-caustic soda ratio (the so-called finishing ratio). The precipitated alumina trihydrate may be classified, and the fine fraction recycled to the precipitation phase as seed hydrate. The coarse fraction is generally filtered, washed, and calcined for production of reduction grade alumina.

In the usual Bayer process, the spent caustic aluminate liquor from the precipitators is subjected to evaporative concentration in order to remove the water equivalent to that introduced into the system for washing the ore residues and by direct steam injection for heating the liquor to digestion temperature, and other dilution water, which is not removed by the flash cooling of the digester effluent liquor or with the product, or otherwise. In the case of monohydrate alumina extraction processes now utilized, this evaporation involves removal of the major portion of the total dilution water from the system. Make up caustic soda is added to replace caustic soda losses, either before or after concentration, and the liquor is then recycled to the digestion phase at the required caustic soda concentration depending upon digestion conditions. Partial heating of the recycled spent liquor is usually accomplished in shell and tube heaters by indirect heat exchange with the flashed steam from depressurizing and cooling of the digestion liquor, followed by direct steam injection to bring the liquor to digestion temperature, after addition of the cooler liquor used to slurry the ore feed.

The Bayer process as practiced in Europe for application to ores in which the alumina is entirely or mainly present in the form of the less caustic soluble monohydrate (Boehmite) is a relatively high heat demand process. The digestion conditions for extraction of monohydrate alumina in this established process are characterized by high caustic soda concentrations, which in the digester feed liquor (concentrated spent liquor) are from about 400 grams per liter up to as high as 600 grams per liter, expressed as $Na_2CO_3$ equivalent. (Throughout the specification and claims, the caustic soda concentrations are expressed in grams per liter (g./l.), and are reported as sodium carbonate, i.e. $Na_2CO_3$, equivalent. The expression "caustic soda" includes the caustic soda combined with the alumina as sodium aluminate, and the free caustic soda in the solution.) The digestion temperatures for European Bayer process monohydrate extraction vary from approximately 170° C. to about 200° C. (from about 340° F. to about 400° F.) The final digester caustic soda concentrations may vary upwardly from about 300 grams per liter, and increase in the liquor cooled by flashing from digester temperature upwardly from about 350 g./l. Under such digestion conditions with appropriate digester residence time of from 1 to 6 hours, substantially complete extraction of the caustic soluble alumina is obtained with production of a pregnant caustic aluminate solution having ratios of from 1.6 to 1.8 mols $Na_2O$ per mol $Al_2O_3$ (about 0.54 to 0.60 gram $Al_2O_3$ per gram of caustic soda expressed as $Na_2CO_3$ equivalent, which expression is hereinafter referred to as the alumina-to-caustic weight ratio and is designated by the symbol A/C).

As a result of the high caustic soda concentrations in the digester effluent utilized for extraction of the alumina, this concentrated liquor must be highly diluted to a caustic soda concentration not substantially exceeding 200 grams per liter, and preferably about 170 to 180 grams per liter, in order to obtain acceptable decomposition reaction rates and to avoid undesirably fine alumina hydrate particles in the precipitation phase. This quantity of dilution water is not necessary for adequate washing of the mud for recovery of soda and alumina, and necessitates a correspondingly large amount of spent liquor evaporation.

In any Bayer process, as evaporation requirements on the spent liquor increase, the demand for heat to the process must correspondingly increase. This may be expressed in the form of increased steam input to the process, or more fundamentally increased boiler fuel for such steam generation. This is due to the fact that in the evaporator operation, there are unavoidable heat losses in the form of steam condensed in the evaporator condensers, that is, "outside" of the process. This heat is lost to the system and must be supplanted by increased extraneous (boiler house) steam to the process and consequent increase in boiler fuel consumption.

The fraction of spent liquor evaporation lost as heat from the system varies with evaporator design and heat content of evaporator feed and effluent liquor flows. However, in the Bayer process with sextuple effect evaporators, the fraction of evaporation to the condensers is about one-fifth of total evaporation and the steam required for evaporation is about one-fifth of the total evaporation. Consequently the heat loss is about equal to the heat requirement. To illustrate the magnitude of this heat loss, for each increase of one pound in net dilution water, an additional pound of water must be evaporated equivalent to about 1000 B.t.u.'s which requires an increase of over 200 B.t.u.'s in steam boiler fuel at ordinary boiler efficiency, i.e., about one-fifth of 1000 B.t.u.'s. With triple effect evaporators the steam boiler fuel required may be double. The heat lost from the system as steam condensed in the evaporator condensers would be about equivalent to the heat required for total evaporation or about 200 to 400 B.t.u.'s for each additional pound of water evaporated.

As pointed out above the European monohydrate process digestion conditions necessitate a net dilution of the system which is exceedingly large. The water equivalent to this net dilution can only be removed by evaporation on the spent liquor. The consequent large evaporation requirement on the spent liquor is one of the major disadvantages of the European Bayer process for production of alumina from monohydrate-containing aluminous materials. The loss of heat content from the system in the form of water vapor condensed in the evaporator condensers necessarily characterizes the process as a high heat demand process. This heat demand increases operating costs, not only with respect to the fuel requirements, but also in regard to labor costs with the attendant increase in evaporator capacity. In addition, capital costs in evaporator equipment are also increased.

The American Bayer process was developed for application to aluminous materials, such as bauxite, in which the caustic soluble or available alumina is present substantially entirely as the more caustic soluble alumina trihydrate (gibbsite).

The higher solubility of trihydrate alumina permitted much lower digestion caustic soda concentrations and also lower temperatures, so that the American Bayer process was more or less standardized at digester effluent caustic soda concentrations of from about 140 to 180 grams per liter and temperatures of 300° F. or below, for example, from 280 to 290° F. Under such conditions, alumina-to-caustic soda ratios in the digester effluent liquor of from 0.60 up to as high as 0.65 are obtainable with digestion periods of from only about thirty minutes to less than an hour. Although these ratios do not represent the maximum or limit of solubility of the trihydrate alumina in the liquor at the above-mentioned digestion conditions, they do represent limiting amounts of alumina which can be carried in the unclarified liquor, while maintaining it in a metastable state at temperatures equal to or somewhat below the atmospheric boiling point of the solution in order to avoid undue loss of alumina by autoprecipitation during clarification.

The conditions employed in the American Bayer trihydrate process, however, are insufficient to give economical recovery when applied to the less caustic soluble monohydrate alumina-containing materials.

The rapid expansion of the aluminum industry has necessitated utilization of caustic soluble monohydrate alumina-containing materials, since the available supply of ores in which substantially all of the caustic soluble alumina is trihydrate are insufficient to meet the demands for raw material. As a consequence, various processes have been developed or suggested for the treatment of these new raw materials containing caustic soluble monohydrate alumina, which in most instances is mixed with a predominant amount of trihydrate alumina.

A two stage extraction process has been developed in which the caustic soluble alumina is totally extracted from a limited charge of ore under monohydrate extraction conditions in a first digestion step to an alumina-to-caustic soda ratio in the effluent liquor below that most advantageous for precipitation (typical American Bayer ratios), and a second charge of ore, which is at least predominatntly trihydrate alumina-containing, is digested in this liquor of intermediate ratio under conditions which will extract trihydrate only to increase the alumina content of the liquor to a suitable value for precipitation. In such two-stage process, the initial monohydrate extraction may be performed under caustic soda concentration conditions more favorable than standard European monohydrate process conditions with complete extraction of the caustic soluble alumina due to the fact that in this first stage the liquor is not charged with all of the ore which must be extracted. However, this process is limited in its most advantageous application to the availability of an all trihydrate ore for the second charge, and where a monohydrate alumina-containing ore is charged in the second digestion (the so-called trihydrate extraction), the monohydrate alumina is not recovered. In addition to this limitation, the process still involves the disadvantage of relatively high heat demand due to the spent liquor evaporation requirements, although appreciably less than in the typical European process.

None of the established processes for extraction of alumina from aluminous materials containing caustic soluble monohydrate substantially avoid the disadvantage of high evaporation requirements on the spent liquor characteristic of the European process, that is, high heat demand, while totally extracting the almina in a single digestion. The two stage process, more favorable in regard to heat demand, requires an all trihydrate alumina or for most economical operation in regard to alumina recovery based on raw material input.

Accordingly, it is a primary purpose and object of the present invention to provide a novel wet alkali aluminate method for the production of alumina from aluminous materials containing caustic soluble monohydrate alumina characterized by the combined advantages of total extraction in a single digest and low heat demand.

A further object of the invention is to provide a single stage total extraction process for monohydrate alumina-containing ores operated under such digestion and other conditions that net dilution of the system is substantially reduced, and evaporation on the spent liquor is substantially or completely eliminated. The more fundamental advantage of low or minimum heat demand is thus realized by avoidance of heat loss from the process associated with large scale spent liquor evaporation. Conversely the process of the invention retains a maximum of the heat content of the liquor within the system.

The novel process is universally applicable to aluminous materials containing monohydrate alumina, including ores or mixtures thereof, wherein substantially all of the caustic soluble or available alumina is in the less caustic soluble monohydrate form, and those in which any minor quantities of monohydrate alumina are mixed with predominant amounts of the more caustic soluble trihydrate alumina, or other more caustic soluble forms of alumina.

Another object of the invention is to provide a process for the substantially complete extraction of caustic soluble alumina from materials containing monohydrate alumina by a single stage digestion under conditions such that all or substantially all of the required evaporation is accomplished on the pregnant (green) digester effluent liquor by flash steam generation during flash cooling and depressurizing of such liquor. A more specific related object of the invention in providing a low heat demand process is the substantially full utilization of the heat content of the steam generated by flash cooling of the pregnant liquor to heat the spent liquor both indirectly and directly.

A further object of the invention is to provide a high temperature-dilute liquor monohydrate alumina extraction process combined with indirect heating of the spent liquor to such an extent that dilution of the digestion liquor by direct steam injection is substantially reduced, which permits removal of all or substantially all of the net dilution by evaporation on the pregnant (green) digester effluent liquor at the flash chambers, and completely or substantially eliminates evaporation on the spent liquor.

Another object of the invention is to provide a modified cyclic Bayer-type process for recovery of alumina from monohydrate alumina-containing raw materials characterized by lower capital costs per annual ton of recoverd alumina, and lower operating costs in regard to the heat requirements compared to other monohydrate extraction processes, such as the classical European method, or the two stage extraction method above-mentioned.

A further object of the invention is to provide a process for recovery of alumina from aluminous materials containing caustic soluble monohydrate alumina in which at least a major portion of the net dilution water in the system is removed in the pregnant liquor flash chambers and not more than a minor portion is removed by evaporation on the recycled spent liquor.

Also it is an object of the invention to provide a single stage digestion process for the total extraction of the caustic soluble alumina from aluminous materials containing caustic soluble monohydrate alumina in which the digestion temperatures are such that a relatively dilute liquor is employed, having caustic soda concentrations not substantially exceeding, and even equal to or below, those utilized for extraction of aluminous materials in which the caustic soluble alumina is substantially all in the more soluble trihydrate form. These and other objects and advantages of the invention will become apparent from the following detailed description thereof.

According to the present invention, there is provided what may be termed a minimum heat demand process in which removal of water in amount substantially equivalent to the net clarification and injection steam dilution water occurs during flash cooling of the pregnant digester effluent liquor. Conversely the invention provides a substantially "evaporatorless" process with respect to the spent liquor recycle to the digestion phase.

The invention essentially resides in the combination of a high-temperature dilute-liquor digestion of the caustic soluble monohydrate alumina-containing material with indirect heating of the spent liquor in amount sufficient to limit digestion injection steam dilution such that substantially, all, or at least the major portion of the required evaporation is accomplished on the pregnant digester effluent liquor by flash steam generation in flash cooling and depressurizing the liquor from the high digestion temperatures. The flash steam is fully utilized in heating the spent liquor, primarily indirectly, and also directly. Thus, with elimination of evaporation on the spent liquor and its consequent heat losses, the process of the invention contains the heat within the system, and combines the advantages of a low heat demand process with total extraction in a single stage digestion.

In contrast to the lower temperature-high caustic soda concentration processes, the diluted spent liquor may be recycled directly to the digesters (after addition of make-up caustic) without any reconcentration by evaporation, or at least with removal of only a minor portion of dilution water. In effect, substantially all of the net dilution water added for clarification and precipitation remains in the liquor recycled to digestion and is effectively removed together with the limited digester dilution water from the pregnant digester effluent liquor by flash evaporation during depressurizing. In turn, compared with the high caustic soda concentrations of the European process, the process operating on a more dilute digester effluent liquor of lower caustic soda concentration, permits substantial reduction in the amount of dilution water added to the pregnant liquor to provide a caustic soda concentration not greatly exceeding 200 grams per liter, preferably 170–180 g./l. for clarification and precipitation.

The high-temperature dilute-liquor process of the invention permits the treatment of aluminous materials containing caustic soluble monohydrate alumina for substantially complete extraction of the caustic soluble alumina at alumina-to-caustic soda ratios of at least 0.60 and higher, for example, 0.65 (or even above 0.70 with pressure clarification). Moreover, the invention accomplishes such result at digester effluent caustic soda concentrations comparable to and even below those which are utilized in the American Bayer practice for extraction of the more soluble trihydrate alumina. Such a result may be characterized as unexpected in view of the prior art indication that for substantially complete extraction of the caustic soluble alumina from a monohydrate alumina-containing material at comparable alumina-to-caustic soda ratios increase in either temperature or caustic soda concentration with respect to American Bayer process digestion conditions is not sufficient, and that substantial increase in both temperature and caustic soda concentration is required.

The invention generally comprises an improved wet alkali aluminate process for production of alumina from aluminous materials containing caustic soluble monohydrate alumina in which the aluminous material is pressure digested in recycled spent liquor from which not more than a minor portion of the dilution water is removed, limiting steam injection dilution in heating the spent liquor to digestion temperature by increase in the temperature thereof by an amount in excess of 200° F. and at least to within 100° F. of the digestion temperature by indirect heat exchange, the digestion being conducted at a temperature which provides a monohydrate alumina extraction potential in the diluted liquor at alumina-to-caustic soda weight ratios of at least 0.60 to substantially completely extract the caustic soluble alumina, the digestion temperature also being sufficiently above the atmospheric boiling point of the liquor to provide a temperature decrease upon flash cooling such that at least the major portion of the dilution water is removed therefrom by flash steam generation, and depressurizing the alumina-enriched or pregnant liquor from said digestion temperature to flash cool the same to substantially the atmospheric boiling point thereof.

Thus, the invention in limiting digester dilution by high temperature indirect heating of the spent liquor and digesting at high temperatures makes it possible to conduct all or at least a major portion of required evaporation on the pregnant liquor during flash cooling from the high digestion temperature. Conversely these combined conditions either completely eliminate or reduce to a minor factor the evaporation required on the spent liquor before recycle to digestion. This characterizes the process as a minimum or low heat demand process, since the large unavoidable heat losses in the evaporator condensers associated with the normally large spent liquor evaporation requirements are completely avoided or substantially reduced.

The heat content in the liquor is retained in the system by performing the required evaporation on the pregnant liquor and completely utilizing the heat content of the flash steam generated in flash cooling with which substantially no heat losses are associated. Thus, the demand for steam to the process is substantially lowered.

The large amount of flash steam generated by the high digestion temperature is utilized primarily to increase the spent liquor temperature by indirect heat exchange at least to the degree indicated above, and preferably to as close an approach to digestion temperature as is consistent under practical operating conditions with respect to the scaling rate (desilication scale) of the spent liquor in the indirect heat exchange apparatus.

It should be noted that all Bayer process liquor is scale-forming due to residual dissolved silica which precipitates as an insoluble complex sodium aluminum silicate (desilication product) on the surfaces of the apparatus and liquor lines in the system, particularly those portions exposed to higher temperature liquor, such as the spent liquor heaters. The scale must be periodically removed, particularly from heat exchange surfaces since it greatly lowers heat transfer coefficients. Accordingly, it was generally believed that increase in digester temperature would necessitate increase in digester dilution by direct steam injection, since indirect heating of the spent liquor to a close approach to higher digester temperatures would result in a liquor heater scaling rate prohibitive for practical operating conditions in regard to the maintenance cycle for descaling.

It was discovered, however, during the development of the invention that the foregoing advantages of high temperature-dilute liquor digestion with indirect heating of the spent liquor to a high temperature (an increase in temperature in excess of 200° F. and at least to within 100° F. of digestion temperature) could be accomplished, while maintaining a practical maintenance cycle for descaling the spent liquor heaters. Although not intended to limit the invention to any theory, one factor possibly contributing to this result is that the very high digestion temperatures and dilute liquor cause a more complete desilication of the liquor in the digestion phase with a resulting lower concentration of residual dissolved silica in the circulating liquor recycled through the spent liquor heaters.

In general, the digestion conditions for obtaining the foregoing results in the single stage digestion process of the invention comprise digestion temperatures of from about 450° F. to about 500° F. at caustic soda concentrations in the digester effluent liquor from as low as about 120 grams per liter to about 180 grams per liter, the digestion temperature increasing with decrease in digester effluent caustic soda concentration in order to maintain total extraction conditions. Under these digestion conditions, the caustic soluble alumina monohydrate and also the alumina trihydrate, if any, is substantially totally extracted at alumina-to-caustic soda ratios of at least 0.60, and in most instances to as high as 0.65. The spent liquor is heated by indirect heat exchange with the flash steam from the pregnant liquor to temperatures in excess of 350° F. up to about 400° F., from initial temperatures of from about 140–150° F., so that in all cases the temperature increase is in excess of 200° F. and at least to within 50 to 100° F. of the digestion temperature.

In conjunction with the foregoing spent liquor heating and digestion conditions, the process is preferably operated so that the caustic soda concentration of the diluted liquor fed to the precipitation phase is from above 150 to below 200 grams per liter, preferably from about 170 to about 180 grams per liter.

In the preferred operation of the invention, digester effluent caustic soda concentrations of from about 140 to about 170 grams per liter are recommended. Under such conditions evaporation on the spent liquor is eliminated or maintained near a minimum. Also the further advantage of full utilization of the flash steam is realized in the heating of the spent liquor to digester temperatures by a practical and economical combination of indirect heat exchange and direct injection of flash steam into the spent liquor. Of course, the liquor in the preferred operation is indirectly heated to the fullest extent, e.g. 400° F. The balance of the heating required to bring the spent liquor to the desired digestion temperature is preferably accomplished in part by direct injection of the higher pressure flash steam followed by direct injection of extraneous steam.

Under the preferred digester effluent caustic soda concentration conditions, above set forth, the caustic concentration of the flash cooled liquor is so balanced with respect to the preferred caustic soda concentration for clarification and precipitation, for example, 170 to 180 grams per liter, that the dilution water added during clarification provides adequate soda and alumina recovery from the mud during washing with an advantageously limited number of washing stages, for example, from about 3 to not substantially in excess of 6.

Within these preferred conditions, the spent liquor is heated indirectly by the flash steam to 380–400° F. to provide optimum reduction of digester dilution due to steam injection. At the same time, the digestion temperatures are from about 470 to 480° F. for alumina-to-caustic soda ratios of about 0.65 at total extraction. With this combination, upon depressurizing and flash cooling the digester effluent liquor to substantially the atmospheric boiling point, the amount of flash steam generated is equivalent to substantially all of the required evaporation for removal of dilution water. Thus, evaporation on the spent liquor is completely or substantially eliminated.

The invention, as above described, is fully applicable to any aluminous material containing caustic soluble monohydrate alumina in any proportions ranging from 100% of the caustic soluble or total available alumina down to any minor proportion, for example only a few percent of the total available or caustic soluble alumina. When operated under the foregoing digestion or extraction conditions of caustic soda concentration and temperature the process applied to aluminous materials of mixed monohydrate and trihydrate content provides substantially complete extraction of the total available or caustic soluble alumina at alumina-to-caustic soda ratios in the pregnant liquor of about 0.65 or somewhat higher with very advantageously low digester residence times of about 30 minutes. In addition, comparable alumina-to-caustic soda ratios are obtainable when the process is applied to aluminous materials, such as European ores, in which substantially all of the caustic soluble alumina is present in the form of boehmite, i.e. monohydrate alumina. Since these latter types of ores are of different physical characteristics and somewhat more refractory, the digester residence time may be somewhat extended, or the ore charge (charging ratio) may be slightly reduced to obtain complete extraction at alumina-to-caustic soda ratios of at least 0.60 at comparable digester residence times.

The invention is described in greater detail in conjunction with the diagrammatic flow sheet in the accompanying drawing, which is merely intended to illustrate one complete specific embodiment of the process, without constituting a limitation on the true scope of the invention.

EXAMPLE

In this typical example, the process is applied to the extraction and recovery of the caustic soluble alumina from a Jamaican bauxite containing a major portion of the available alumina as trihydrate, and a minor portion as monohydrate alumina and having the following analysis:

Bauxite analysis, percent by weight—
  Free moisture, 15
  Dry basis:
    45.5% total available alumina
    35.6% trihydrate alumina
    9.9% monohydrate alumina
    2.66% $SiO_2$
    0.15% $P_2O_5$ The term "available" as used herein is intended to mean alumina which is caustic soluble, and therefore theoretically extractable, as opposed to alumina which is caustic insoluble and therefore unextractable. The process embodiment described in conjunction with the flow sheet utilizes a digestion temperature of 476° F. and a caustic soda concentration in the digester effluent of 149 grams per liter with a production capacity of 100 tons per day of calcined alumina ($Al_2O_3$) and operates on a completely evaporatorless basis with respect to the spent liquor.

229 (dry basis) tons of Jamaican bauxite having the above analysis and containing 41 tons of water in the 15% moisture are slurried at 1 in 190 tons of spent caustic aluminate liquor preheated to 200° F. and cut out from the main stream of recycled spent liquor at 2. The slurry is introduced into the heated main recycled spent liquor stream at 3 near the feed point to digestion. The total recycled spent liquor stream of 2,380 tons having a caustic concentration of 192 grams per liter, an alumina-to-caustic soda ratio of 0.356 and a temperature of 145° F. is passed through line 4 into the indirect heat exchange system 5 where 2,190 tons are heated to a temperature of 390° F. with the flashed steam generated in depressurizing and cooling the digester effluent liquor, the slurry liquor being heated only to 200° F. before being cut out from the main stream as above-indicated. The partially heated liquor is then further heated by direct flash steam injection to a temperature of 430° F. at injection heater 6 utilizing 91 tons of injection flash steam which increases the liquor to 2,281 tons and decreases the caustic soda concentration to 182 g./l. It is then blended with the slurry of bauxite from line 3 and fed to the high pressure digesters at 7 where it is heated to final digestion temperature with 282 tons of boiler steam at 500° F. and 600 p.s.i.a. by direct injection. The bauxite is subjected to digestion in the diluted liquor for a period of 35 minutes to totally extract the caustic soluble alumina and to provide adequate time for desilication of the liquor. The insoluble residue-containing liquor effluent from the digester 7 in amount of 2941 tons has a vapor pressure of 490 p.s.i.a., a temperature of 476° F. and an alumina-to-caustic ratio of 0.650. The caustic soda concentration of the liquor is decreased from 192 grams per liter to 149 grams per liter due to digester dilution of the liquor with condensed steam, and water of hydration and moisture in the bauxite.

The digester effluent is passed through high pressure line 8 to flash cooling chambers 9 with a pressure reduction of approximately 100 p.s.i., the flash steam generated being passed through line 10 to direct steam injection heater 6 for direct heating of the incoming spent liquor stream. The liquor containing the residues is passed through line 11 to a series of flash chambers 12 in which the liquor is flash cooled and depressurized to 230° F., substantially the atmospheric boiling point of the liquor. The flash steam generated is passed through line 13 to indirect heat exchange system 5 for heating the spent liquor to 390° F. Flash steam in excess of this requirement is utilized for other purposes; e.g. heating mud wash water, heating alumina hydrate wash water, etc.

The depressurizing and flash cooling of the liquor in the flash chambers 9 and 12 reconcentrates the liquor from 149 grams per liter caustic soda concentration to 201 grams per liter with removal of 631 tons of water as flash steam, leaving 2310 tons of circulating pregnant caustic aluminate liquor of the indicated caustic soda concentration having an alumina-to-caustic soda ratio of 0.650 containing 82 tons of insoluble residue, i.e. mud. Thus, of the total ore and moisture charge of 270 tons, the balance of 188 tons is dissolved in the liquor. The depressurized digester effluent liquor is reduced to atmospheric pressure at blowoff tank 14, where it is diluted with 633 tons of mud washer overflow liquor from line 18 having a caustic soda concentration of 98 grams per liter and temperature of 190° F. to provide a liquor having a caustic soda concentration of 176 grams per liter at a temperature of 220° F. and A/C of 0.648, the liquor volume increasing to 2954 tons primarily as a result of the wash water dilution, and the mud content slightly increasing to 83 tons. The diluted green liquor is then passed to the mud settling equipment 15 where the insoluble residues (red mud) together with a minor portion of the green liquor are removed as underflow in amount of 82 tons of solid and 388 tons of liquor. This slurry of red mud in diluted liquor is passed to the mud washing stage 16 in which most of the alumina and soda in the associated liquor is recovered by countercurrent washing and decantation with wash water introduced through line 17 in amount of 615 tons. The diluted liquor recovered as mud washer overflow is introduced through line 18 to blowoff tank 14, as previously described, for dilution of the feed to the mud settling system 15 in an amount of 633 tons. The washed mud slurry of about 20% solids content is discharged as underflow from mud washer 16, and may be subjected to further treatment such as thickening, if desired.

The clarified mud settler overflow having a caustic soda concentration of 174 grams per liter (very slightly diluted from miscellaneous dilution, such as in the sand trap and not shown) and an alumina-to-caustic soda ratio of 0.646 amounting to 2592 tons is subjected to filtration at 19 to provide a clarified filtrate of 2594 tons, indicating a small amount of dilution water for washing of the red mud cake on the filtration equipment. The clarified green liquor filtrate at a temperature of 210° F. is subjected to further cooling in vacuum flash tanks 20 with removal of 97 tons of water to provide 2497 tons of liquor having a caustic soda concentration of 181 grams per liter, an alumina-to-caustic soda ratio of 0.646 and a temperature of 166° F. At 21 the green liquor is subjected to seeding with previously precipitated alumina trihydrate and alumina trihydrate is precipitated to reduce the alumina-to-caustic soda ratio of the liquor from 0.646 to .357 with recovery of about 45% of the alumina in the liquor, amounting to 100 tons per day after calcination. The product alumina is filtered and washed at 22 with 50 tons of hydrate wash water, and the wet hydrate filter cake removes 182 tons of liquor and alumina trihydrate from the system.

2365 tons of spent liquor separated from the precipitated alumina having an alumina-to-caustic soda ratio of .357 and a caustic concentration of 187 grams per liter and temperature of 145° F. is blended with make-up caustic soda (50% NaOH) in amount of 15 tons to replace the soda losses in the cyclic system, including the soda losses incident to the formation of the insoluble desilication product. The blended liquor in amount of 2380 tons has a caustic soda concentration of 192 grams per liter and alumina-to-caustic soda ratio of 0.356 and a temperature of 145° F. This liquor is then recycled to the heat exchange system 5 for feeding the digesters to repeat the continuously operated cyclic process.

No evaporation on the spent liquor is required, since the high digestion temperature in conjunction with predominantly indirect heating of the spent liquor provides for removal of most of the water from the process on the pregnant liquor side by flash steam generation in flash cooling and depressurizing of the digester effluent liquor. In addition, the circulation of the more dilute liquor reduces net clarification dilution required for washing and proper precipitation conditions, and thus limits the total water to the process which must be removed.

The advantages of the present invention, particularly in terms of heat demand and ore requirements, are best shown by considering the process conditions and partial material balances of this process for the production of one pound of alumina compared with a typical European Bayer process and the above-mentioned two stage extraction process operating on the same mixed monohydrate-trihydrate ore of the foregoing example. The following tabulated data provides all factors for such a comparison.

Table

|  | Evaporatorless Process of Example | European Monohydrate Process | Two Stage "Sweetening Process" |
|---|---|---|---|
| Spent Liquor: |  |  |  |
| Alumina to caustic soda ratio | 0.356 | 0.240 | 0.315 |
| Caustic soda concentration, g./l. | 192 | 400/460 | 248 |
| Temperature, °F | 145 | 150 | 150 |
| Preheat Temperature, °F in last indirect Heat Exchanger | 390 | 390 | 320 |
|  |  |  | Monohydrate Digest |
| Digester Conditions: |  |  |  |
| Alumina to caustic soda ratio digester effluent | 0.650 | 0.570 | 0.560 |
| Caustic soda concentration, g./l. | 149 | 345/390 | 200 |
| Temperature, °F | 476 | 390 | 400 |
|  |  |  | Trihydrate Digest |
| Digester Conditions: |  |  |  |
| Alumina to caustic soda ratio digester effluent |  |  | 0.655 |
| Temperature, °F |  |  | 285 |
| Clarified Pregnant Liquor to Precipitation: |  |  |  |
| Caustic soda concentration, g./l. | 181 | 200 | 180 |
| Temperature, °F | 166 | 125 | 170 |
| Bauxite to Process, dry [1] | 2.29 | 2.29 | 2.56 |
| Water to Process: |  |  |  |
| Bauxite moisture | 0.4 | 0.4 | 0.4 |
| Bauxite alumina water of hydration | 0.5 | 0.5 | 0.5 |
| Digester injection steam | 2.8 |  | 2.2 |
| Extraneous injection steam (to spent liquor preheaters) | 0.9 |  |  |
| Total Digester Dilution | 4.6 | 0.9 | 3.1 |
| Net Clarification Dilution [2] | 2.9 | 10.2/11.1 | 5.1 |
| Alumina Hydrate Wash Water | 0.5 | 0.5 | 0.5 |
| Make-up caustic water | 0.1 | 0.1 | 0.1 |
| Total Water to Process | 8.1 | 11.7/12.6 | 8.8 |
| Water from Process: |  |  |  |
| Pregnant Liquor— |  |  |  |
| Digestion flash | 6.3 | 1.7/1.5 | 2.8 |
| Vacuum flash | 1.0 | 1.5 | 0.9 |
| Spent Liquor— |  |  |  |
| Alumina water of hydration and moisture | 0.8 | 0.8 | 0.8 |
| Evaporators | None | 7.7/8.8 | 4.3 |
| Total Water from Process | 8.1 | 11.7/12.6 | 8.8 |
| Percent Total Evaporation: |  |  |  |
| Digestion Flash Steam | 86 | 16/13 | 35 |
| Vacuum Flash Steam | 14 | 14/13 | 11 |
| Spent Liquor Evaporators | 0 | 70/74 | 54 |
| Total | 100 | 100/100 | 100 |
| Heat Input (B.t.u./lb. Al₂O₃ produced) [3] | 2,700 | 3,700/3,900 | 3,300 |

[1] All weight quantities are expressed in pounds per pound of alumina produced except where otherwise indicated.
[2] Mud washer overflow minus mud settler underflow.
[3] Net heat required for digestion, wash water heating, and spent liquor evaporation.

It may be seen from the table that the high temperature-dilute liquor "evaporatorless" process of the invention provides an advantage over the two stage process in regard to bauxite requirements due to the inability of the latter process to extract the monohydrate alumina in the second or "sweetening" digestion. Moreover, the spent liquor evaporation requirements and therefore steam to process and heat input requirements are greatly reduced in the process of the invention compared to the two stage process.

Due to the high digestion temperature and consequent large amount of digestion flash steam coupled with the limitation on digester dilution by indirect heating of the spent liquor, the process of the invention provides an even more marked advantage over the concentrated liquor process typical of the European Bayer process for monohydrate extraction. Evaporation on the spent liquor is eliminated, thus avoiding the large heat losses associated with the extensive spent liquor evaporation required on the diluted spent liquor in reconcentrating to European process digester conditions. The heat input to the process is therefore correspondingly reduced at the same raw material economy due to total extraction.

The foregoing specific comparison based on the example of the process of the present invention and a typical European Bayer and two stage processes is fully representative of the advantages accruing from the invention in its generic scope.

It is furthermore within the generic scope of the invention to substantially completely eliminate digester dilution, by heating the spent liquor indirectly to digester temperature, particularly when operating at the higher digester effluent caustic soda concentrations and correspondingly lower digester temperatures within the ranges set forth above. Thus, the temperature decrease in flash cooling of the digester effluent from lower digester temperature to the atmospheric boiling point will perform at least the major portion of the required evaporation.

Various modifications may be made to the process without departing from the spirit of the invention among which may be mentioned pressure clarification of the pregnant liquor in which case the dilution for clarification is further reduced, and the liquor may be partially depressurized or flash cooled before clarification and then reduced to atmospheric pressure after removal of the insoluble residues. An advantage of ability to charge to higher alumina-to-caustic soda ratios, e.g. .70 and higher is obtainable with pressure clarification, since the liquor is diluted by washing while still heated substantially above the atmospheric boiling point, and therefore is less supersaturated and more stable toward premature auto-precipitation.

Starch or other flocculating agents may be, and are usually, employed in liquor clarification to aid in red mud settling, and lime may be added for dephosphating the liquor, or for other purposes.

Vacuum flashing of the pregnant liquor may be eliminated where the temperature and/or caustic soda concentration of the clarified pregnant liquor are otherwise adjusted, such as higher initial precipitation temperatures and clarification caustic soda concentrations about equal to or even slightly higher than the desired concentration for precipitation, e.g. 170–180 g./l. The evaporation of water equivalent to that removed in vacuum flashing may be accomplished by reduction in digester dilution and/or slight increase in evaporation on the spent liquor. Accordingly, the invention is not to be construed as limited to any fixed digestion dilution, or to vacuum flashing of the clarified pregnant liquor, and in the foregoing specification and appended claims, the invention is defined in terms of water removal due to digester dilution, and net clarification dilution, and consequent evaporation in terms of removal from the pregnant liquor by digester flash steam generation and removal from spent liquor by evaporation. In its more specific and preferred aspects, the invention according to the specification and claims is defined to include limited digester dilution, and substantially full utilization of flash steam from the digester effluent in heating the spent liquor, primarily indirectly to a close approach to digester temperature.

What is claimed is:

1. In the wet alkali aluminate process for the production of alumina from aluminous materials containing caustic soluble monohydrate alumina, wherein the alumina is extracted by pressure digestion of the aluminous material in recycled spent caustic aluminate liquor leaving an insoluble residue, the pregnant liquor is depressurized and flash cooled and water is removed therefrom by flash steam generation, the spent liquor is diluted by injection steam in heating to digestion temperature, the pregnant liquor is diluted by addition of wash water used in washing of said insoluble residues, and an amount of water equivalent to the net dilution is removed therefrom by evaporation in each cycle, the improved process for total extraction of the caustic soluble alumina with substantially reduced heat input, which comprises pressure digesting the aluminous material in the diluted spent liquor from which not more than a minor fraction of the net dilution water is removed, limiting digestion dilution by increasing the spent liquor temperature by an amount in excess of 200° F. and at least to within 100° F. of the digestion temperature by indirect heat exchange with the flash steam generated by flash cooling the pregnant liquor, the digestion being conducted at a temperature sufficiently above the atmospheric boiling point of said diluted liquor such that on depressurizing and flash cooling thereof at least the major portion of the net dilution water is removed by flash steam generation, and depressurizing the pregnant liquor to substantially the atmospheric boiling point thereof.

2. A process according to claim 1 in which substantially all of the required evaporation is performed on the pregnant liquor effluent from digestion by flash steam generation during depressurizing and flash cooling.

3. In the continuous wet alkali aluminate process for the production of alumina from aluminous materials containing caustic soluble monohydrate alumina, wherein the alumina is extracted by pressure digestion of the aluminous material in recycled spent caustic aluminate liquor leaving an insoluble residue, the alumina-enriched liquor is depressurized and flash cooled with removal of water therefrom by flash steam generation, the spent liquor is diluted by injection steam in heating to digestion temperature, the alumina-enriched liquor is diluted by addition to wash water used in washing of said insoluble residues, and an amount of water equivalent to the net dilution is removed therefrom by evaporation in each cycle, the improvement of providing total extraction of caustic soluble alumina at alumina to caustic soda weight ratios of at least 0.60 with substantially reduced heat input, which comprises removing not more than a minor portion of the net dilution water by evaporation on the recycled spent liquor, limiting digestion dilution by increasing the spent liquor temperature by an amount in excess of 200° F. and at least to within 100° F. of the digestion temperature by indirect heat exchange with the flash steam generated in flash cooling, pressure digesting the aluminous material in the diluted spent liquor at a temperature sufficient to provide a monohydrate alumina extraction potential in the liquor at alumina to caustic soda ratios of at least 0.60, said digestion temperature also being sufficiently above the atmospheric boiling point of the liquor such that on depressurizing and flash cooling thereof at least the major portion of the net dilution water is removed by flash steam generation, and depressurizing the alumina-enriched liquor to substantially the atmospheric boiling point thereof.

4. A process according to claim 3 in which substantially all of the required evaporation is performed on the alumina-enriched liquor effluent from digestion by flash steam generation during depressurizing and flash cooling.

5. A process according to claim 3 in which a minor portion of the required evaporation is performed on the spent liquor prior to recycling said liquor to digestion.

6. In the cyclic wet alkali aluminate process for the production of alumina from aluminous materials containing caustic soluble monohydrate alumina, wherein the alumina is extracted by pressure digestion of the aluminous material in recycled spent caustic aluminate liquor leaving an insoluble residue, said spent liquor is diluted by direct steam injection in heating to digestion temperature, the pregnant liquor is depressurized and flash cooled with removal of water by flash steam generation, the depressurized liquor is diluted by addition of wash water used in washing of said insoluble residue, said dilution providing a liquor of reduced caustic soda concentration for the precipitation of alumina therefrom, the alumina is recovered by precipitation, and the net dilution water is removed by evaporation in each cycle, the improvement of providing total extraction with reduced heat input, which comprises performing only a minor portion of the required evaporation on the spent liquor recycled to digestion, limiting digestion dilution by heating the spent liquor to a temperature in excess of 350° F. and to within at least 100° F. of the digestion temperature by indirect heat exchange with the flash steam generated by flash cooling the pregnant liquor, pressure digesting the aluminous material in the diluted liquor at a digestion temperature which provides a monohydrate extraction potential in the diluted liquor at alumina-to-caustic soda ratios of at least 0.60, said digestion temperature being sufficiently above the atmospheric boiling point of said liquor such that on depressurizing and flash cooling thereof at least the major portion of the required evaporation is performed by flash steam generation, and depressurizing the pregnant liquor to substantially the atmospheric boiling point thereof.

7. A process according to claim 6 in which the digestion temperature is from about 450° F. to about 500° F., and the caustic soda concentration of the liquor effluent from digestion is from about 120 to not substantially in excess of 180 grams per liter, said digester effluent caustic soda concentration varying inversely with said digestion temperature to provide the stated monohydrate alumina extraction potential, and the liquor of reduced caustic soda concentration for precipitation has a caustic soda concentration from above 150 to below 200 grams per liter.

8. A process according to claim 6 in which the digestion temperature is between about 470 and about 480° F. and the digester effluent liquor caustic soda concentration is between about 140 and about 170 grams per liter, said caustic concentration varying inversely with said temperature, and the reduced caustic soda concentration of the diluted liquor for precipitation is from about 170 to 180 grams per liter.

9. An improved high temperature-dilute liquor Bayer-type process for the production of alumina from aluminous materials containing caustic soluble monohydrate alumina providing total extraction of the caustic soluble alumina with reduced process dilution of the liquor and consequent reduced heat input, which comprises pressure digesting said material in recycled spent caustic aluminate liquor at a temperature of from about 450 to about 500° F., limiting dilution of the spent liquor by indirect heating to a temperature of from about 380 to 400° F., the pregnant liquor effluent from digestion having a caustic soda concentration which provides a monohydrate alumina extraction potential at alumina-to-caustic soda ratios of at least 0.60 at said digestion temperature thereby substantially completely extracting the caustic soluble alumina, depressurizing and flash cooling said pregnant liquor from said digestion temperature to substantially the atmospheric boiling point with flash steam generation, and thereafter diluting the reconcentrated depressurized liquor for clarification and recovery of alumina by precipitation to a caustic soda concentration of from above 150 to below 200 grams per liter, the flash steam generated during depressurizing being equivalent in amount to at least the major portion of the net dilution of the liquor during said process, and being used at least in part for said indirect heating of the spent liquor.

10. A process according to claim 9 in which the digestion temperature is from about 470 to 480° F. and the digester effluent liquor caustic soda concentration is from about 140 to 170 grams per liter varying inversely with said temperature, and that of the diluted liquor of reduced caustic soda concentration for clarification and precipitation is from about 170 to 180 grams per liter.

11. A process according to claim 9 in which the diluted spent liquor is recycled to digestion without any reconcentration by evaporation.

12. An improved high temperature-dilute liquor Bayer-type process for the production of alumina from aluminous materials containing caustic soluble monohydrate alumina providing total extraction of the caustic soluble alumina with reduced liquor process dilution, and consequent reduced heat input, which comprises pressure digesting said material in diluted recycled spent caustic aluminate liquor having a caustic soda concentration not substantially exceeding 200 grams per liter at a temperature of from about 450° F. to about 500° F., limiting dilution of said spent liquor by direct steam injection in heating the liquor to said digestion temperature by indirect heating thereof to from 380 to 400° F., said diluted liquor effluent from digestion having a caustic soda concentration of from about 120 to about 180 grams per liter to substantially completely extract the caustic soluble alumina from said material at an alumina-to-caustic soda ratio of at least 0.60, depressurizing and flash cooling the pregnant liquor from said digestion temperature to substantially the atmospheric boiling point with removal of water by flash steam generation, and thereafter diluting said flash cooled liquor for clarification and recovery of alumina by precipitation to a caustic soda concentration of from about 170 to about 180 g./l., the amount of flash steam generated during flash cooling of the digester effluent liquor providing at least the major portion of the evaporation required due to dilution from steam injection and the net dilution for clarification and precipitation, said flash steam being used in part for said indirect heating of the recycled spent liquor, and performing only a minor portion of the evaporation on the spent liquor prior to recycling.

13. A process according to claim 12 in which the digester effluent caustic soda concentration is from about 140 to about 170 g./l. with an alumina-to-caustic soda ratio of at least 0.65.

14. A process according to claim 12 in which substantially no evaporation is performed on the spent liquor.

15. A process according to claim 12 in which the partially indirectly heated spent liquor is heated to a closer approach to digestion temperature by direct injection of the higher pressure portion of the flash steam generated during flash cooling of the liquor effluent from digestion.

References Cited in the file of this patent
UNITED STATES PATENTS

| | | |
|---|---|---|
| 1,262,062 | Lawrie | Apr. 9, 1918 |
| 2,701,752 | Porter | Feb. 8, 1955 |

OTHER REFERENCES

Industrial and Engineering Chemistry, "Alumina," vol. 47, No. 9, pages 1672 to 1680.